Aug. 1, 1944.  H. L. RUSCH  2,354,836
APPARATUS FOR RECORDING THE BROADCAST STATION
TO WHICH A RADIO RECEIVER IS TUNED
Filed May 12, 1939   6 Sheets-Sheet 1
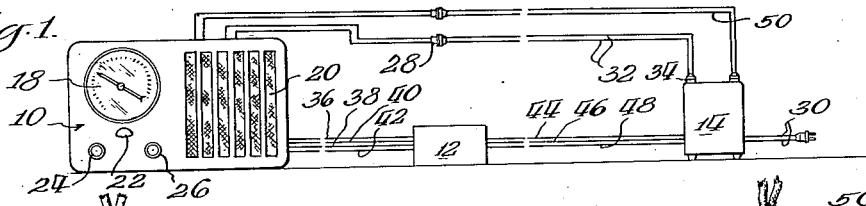
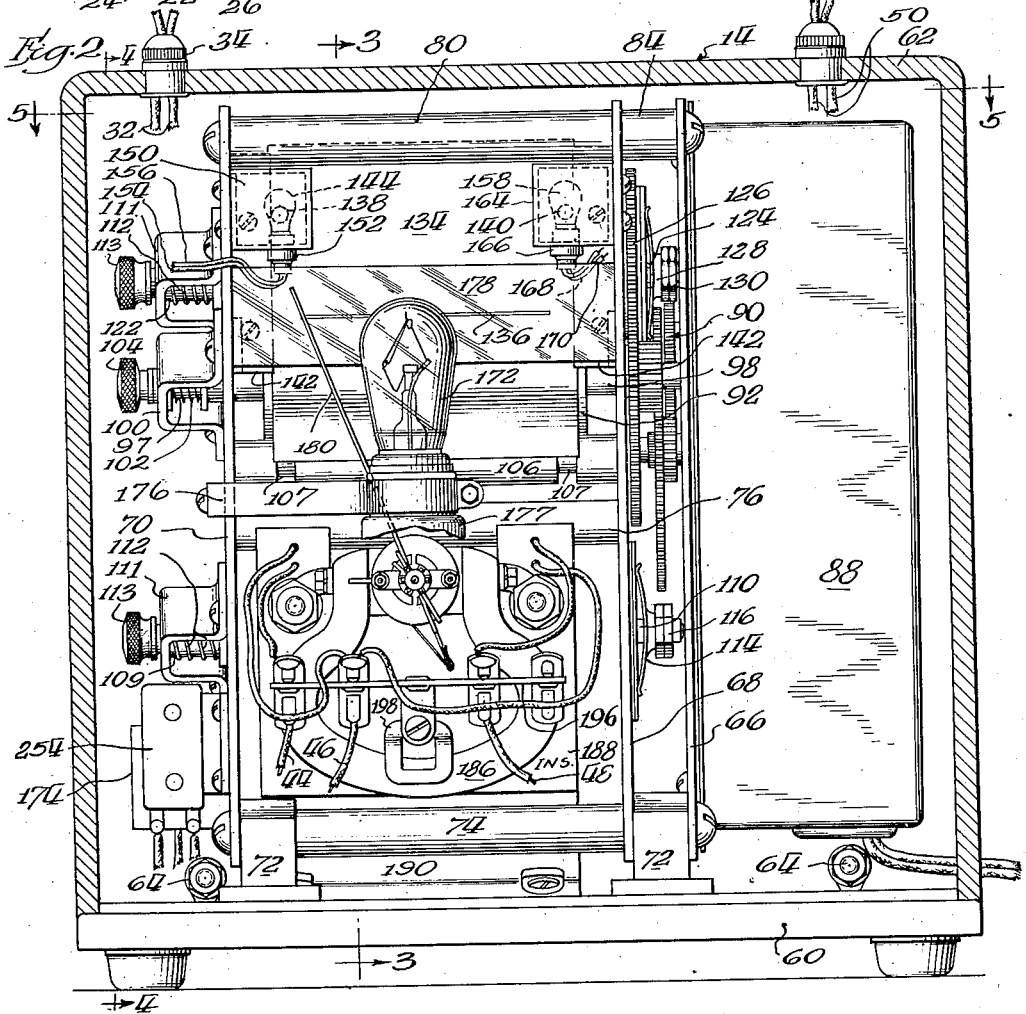
Inventor
Hugo L. Rusch

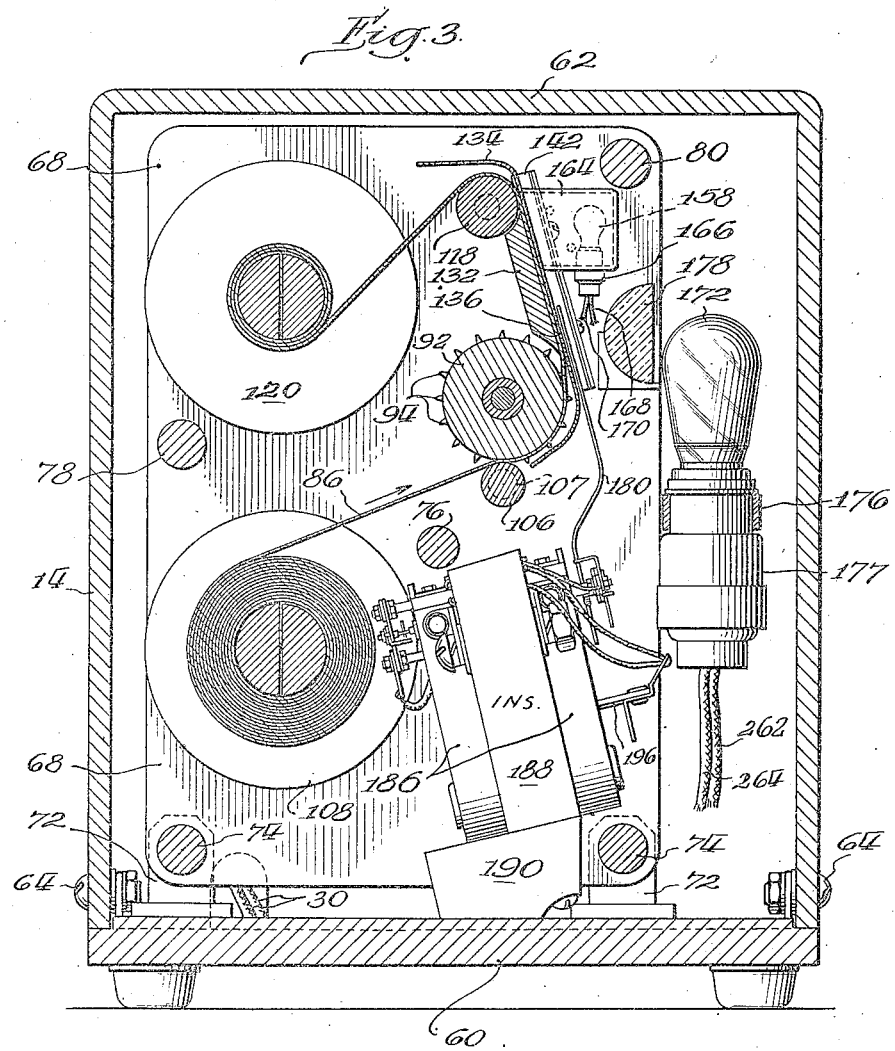

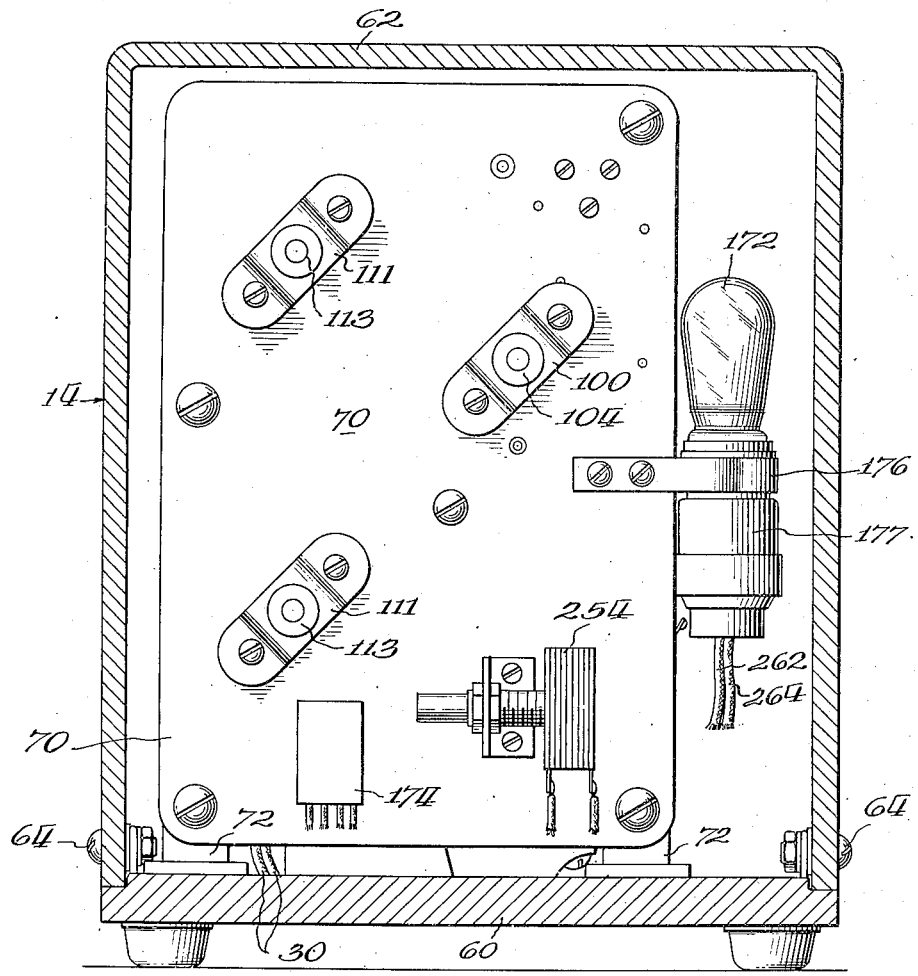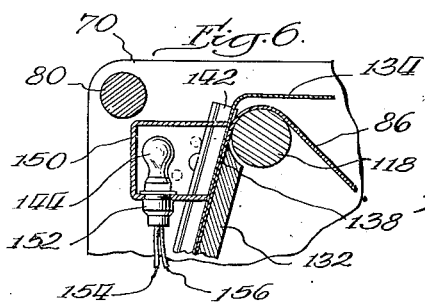

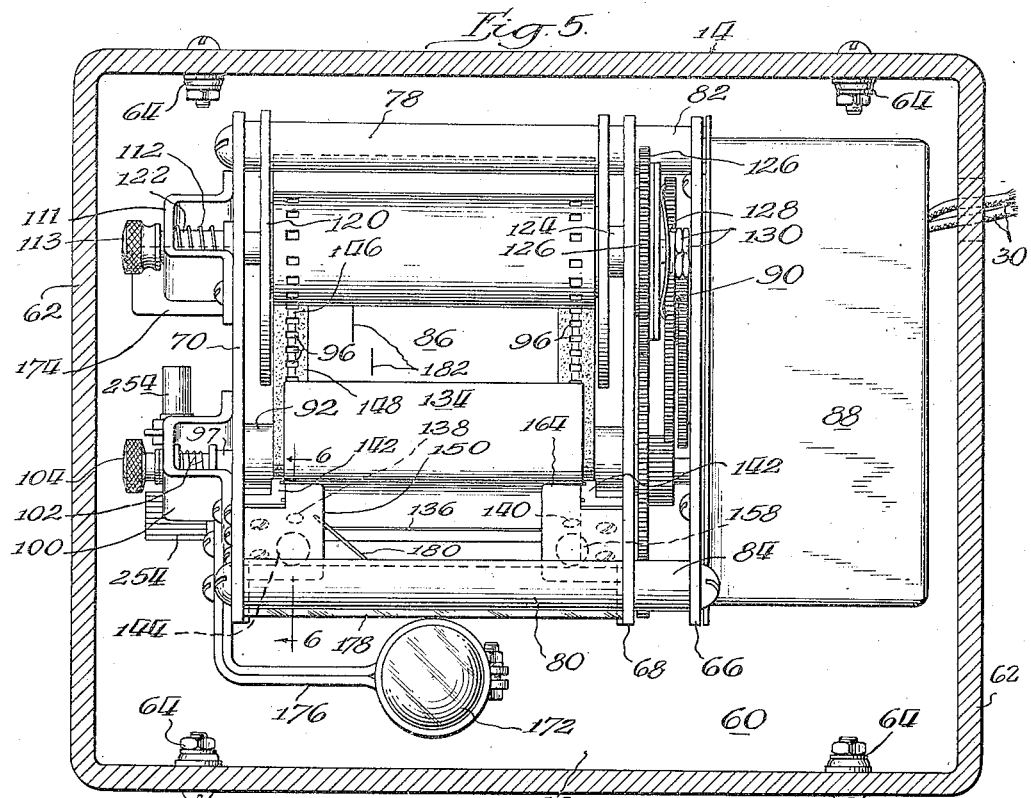

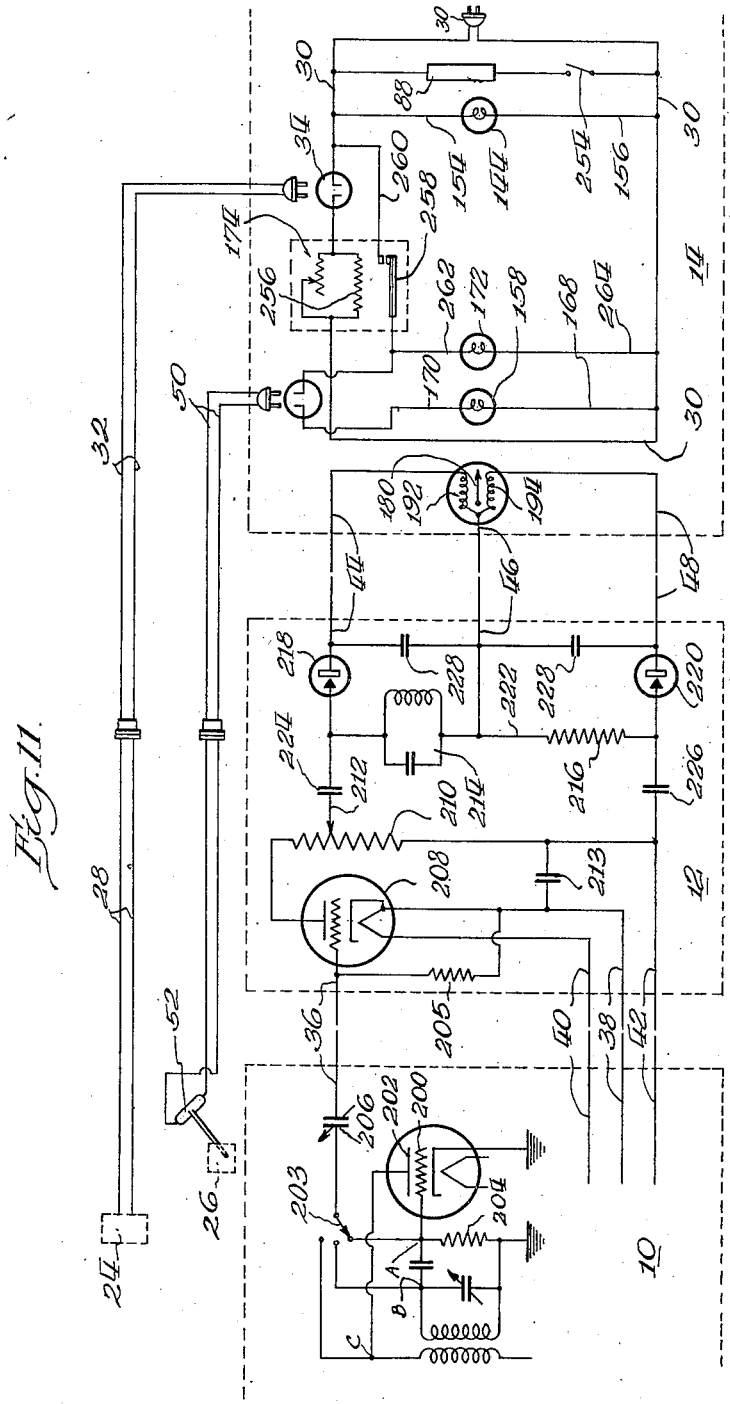

Aug. 1, 1944. H. L. RUSCH 2,354,836
APPARATUS FOR RECORDING THE BROADCAST STATION
TO WHICH A RADIO RECEIVER IS TUNED
Filed May 12, 1939 6 Sheets-Sheet 6
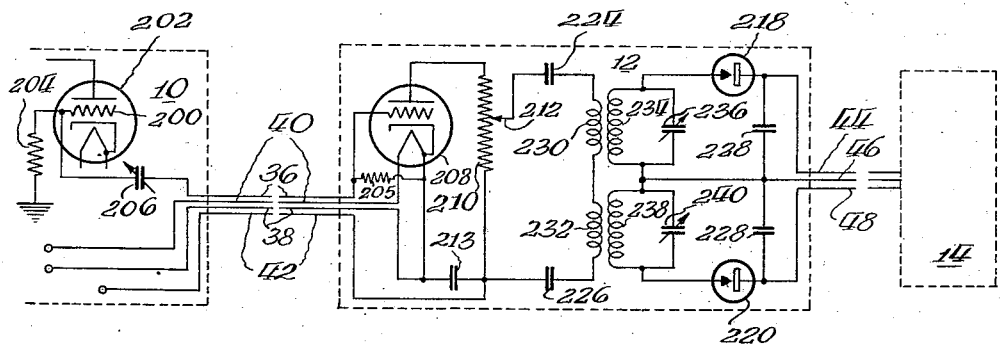
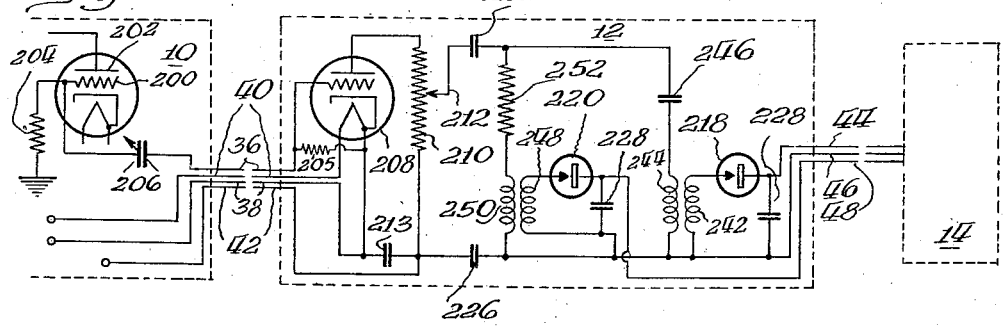
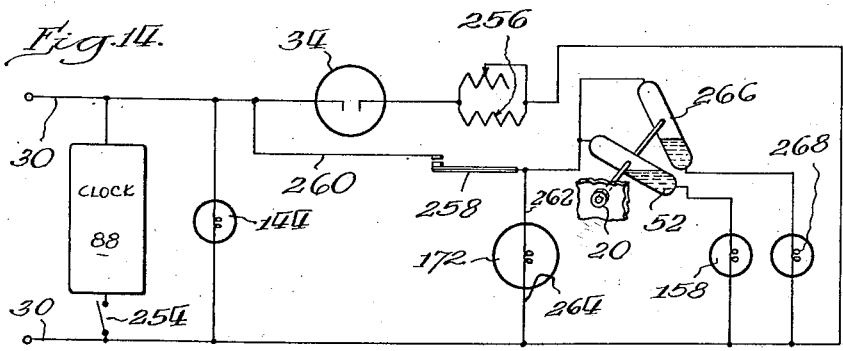
Inventor.
Hugo L. Rusch
By
Williams, Bradbury, McCaleb & Hinkle
Attys.

Patented Aug. 1, 1944

2,354,836

UNITED STATES PATENT OFFICE 2,354,836

APPARATUS FOR RECORDING THE BROADCAST STATION TO WHICH A RADIO RECEIVER IS TUNED

Hugo L. Rusch, Highland Park, Ill.

Application May 12, 1939, Serial No. 273,300

10 Claims. (Cl. 234—1.5)

The merchandise distributor of today utilizes various mediums to advertise his products. Prior to early technological improvements, advertising was done primarily by word of mouth and later, by the printed word. The number of people reached by these two modes of advertising could be ascertained fairly easily and with a fair degree of accuracy. When advertising by word of mouth, the advertiser could estimate the number of people within hearing distance, and the number of people reached by printed advertising could be estimated by noting the circulation of the newspaper, magazine, or circular carrying the advertising.

The advent of radio and utilization of it as a medium of advertising so separated the advertiser from the consumer that the former was left without dependable means for ascertaining either the number of prospective customers reached by or the efficacy of his advertising. In spite of these unknown factors, vast sums are being spent today in radio advertising, and the need for adequate means of determining the size and response of the radio audience is more apparent every day. With the growth of international broadcasting, the determination of the size of the radio audience for specific programs may reach political significance.

Various methods have been devised to obtain some measure of the number of people listening to radio programs. Among these may be included popularity contests, offers of prizes or products which may be obtained free or at nominal cost, random telephone inquiries, and even bald requests for communications. These methods are generally unsatisfactory because they require some positive action on the part of the listener, depend upon the memory factor, and give no indication of the number of people who may have turned off their sets when a program started or who may have tuned to another station either at the beginning or during a program.

A few attempts have also been made to devise suitable apparatus for recording the radio listening habits or program preferences of a number of individuals representative of the general public—i. e., to obtain data indicating listener response—but these attempts have proved to be unsatisfactory for various reasons. Among these reasons may be included the failures due to heretofore unknown factors in the home, such as the large variety and types of radio receiving sets, the failure of electric power due to many causes, such as blown fuses, etc., and the tendency of home owners to tamper with mechanisms that are constantly in their sight. It was only by putting the basic ideas of my apparatus into actual practice that difficulties such as the foregoing were encountered and corrected.

Formerly, the difficulties encountered in connecting any recording apparatus to a radio receiving set frequently resulted in the refusal of the home owner to grant permission for the installation, whereas with a more readily connected device, this permission is far more easily obtained.

A lack of knowledge of the theory of sampling prohibited an efficient plan of procedure for such a radio research project, because, unless the recording apparatus is scientifically placed, the cost of the program becomes prohibitive.

My invention has for its general object the provision of a new and improved apparatus for determining and recording the listening habits, or the listener response, of radio listeners. The apparatus may be designated an "Audimeter," because of the functions it is capable of performing.

Before proceeding with a detailed consideration of the manifold objects of my invention, it may be well briefly to describe it in order that its advantages and the objects hereinafter to be amplified may be better understood.

In brief, the method of my invention consists in deriving from the radio receiver an electric signal voltage which is utilized to designate and differentiate between the various broadcast stations to which the receiver may be tuned, supplying the voltage to a meter responsive to the impulse, and recording the response of the meter. The characteristic of the signal that I utilize is the frequency of the radio frequency voltage supplied by the local oscillator associated with the superheterodyne receivers most commonly used today. However, the frequency of the incoming radio frequency signal voltage which can be derived from the radio frequency section of any radio broadcast receiver, such as found in tuned radio frequency circuits, may be utilized. While the description is based on the adaptation to a superheterodyne circuit, it is readily adapted to other types of receiver circuits.

The apparatus of my invention comprises an electrical inductance or capacitance pickup from the local oscillator circuit of the receiver, a device directly responsive to the frequency or wave length of the broadcasting station to which the radio receiver is tuned, and means for recording the response of the device. However, as stated in the preceding paragraph, the electrical connection may be made to the radio frequency section of the receiver. The device responsive to the radio frequency is of unique construction and may take one of several forms that are described in detail hereinafter. By employing the method of coupling just described, the device has sufficient sensitivity so that the small amount of energy taken from the radio set will in no way interfere with radio set operation.

The recording device may be of any known type, but I have found it desirable to utilize electrically energized light sources and photo-sensitive means for a number of reasons appearing hereinafter. In addition to the above-mentioned parts of the system, amplifying means may be interposed between the frequency responsive device and the radio receiver in order to decrease the amount of signal voltage taken from the radio receiver and, at the same time, provide sufficient voltage satisfactorily to actuate the frequency responsive device.

From this brief outline of my invention, it may be seen that it possesses numerous advantages. One of the major advantages is that it can be constructed as a unit or, if desired, a plurality of units, which can be built economically and readily installed with no changes or complicated and objectionable attachments to existing radio receivers. Furthermore, my invention provides a system in which either or both the radio frequency responsive device and recording apparatus, particularly the latter, may be located at a point remote from the receiver where it is unnoticed by the listener and where the recorded data may be collected with a minimum of inconvenience to the listener. Accordingly, the listeners' receiving habits are less likely to be affected and the devices may be more readily installed in homes where the few prior art devices not possessing the enumerated advantages are now unwelcome.

Other advantages will readily suggest themselves to those skilled in the art. For instance, my invention is equally applicable, irrespective of the mode of tuning the receiver, that is, it is applicable equally well to sets with variable capacity condensers which are tuned manually by rotatable dial knobs, by push buttons, or tuned from remote points by remote control or automatically according to a preselected program. It is also applicable to radio receivers that have fixed condensers with push button tuning for certain broadcasting stations. Likewise, in its broadest form, my invention can be used to record all stations listened to, regardless of whether these stations broadcast within commercial broadcast or short-wave bands.

The primary object of my invention, therefore, is the provision of improved apparatus for measuring and recording the listening habits of radio listeners.

A further object of my invention is to provide apparatus for measuring and recording listener response to radio programs actuated responsively to an electrical characteristic of the receiving set.

A further object of my invention is to provide apparatus for measuring and recording listener response to radio programs actuated responsively to an electrical characteristic of voltage derived from the receiving set and including means for amplifying the voltage.

A further object of my invention is to provide apparatus of the type mentioned in which the recording apparatus is adapted to be connected electrically to the receiving set so that it may be located at some point remote from the receiving set where it will be unnoticed by the listener and the records may be removed therefrom with a minimum of inconvenience and disturbance to the listener.

A further object of my invention is to provide apparatus of the type described, that is easy to attach to all types of existing radio receiving sets, and which may be equally well built into and made part of new receiving sets, and will not interfere with the operation of the receiving sets.

Another object of my invention is to provide apparatus of the type described with means for controlling the value of the derived voltage so that the voltage supplied to the amplifying means may have a value properly suited for the frequency responsive means.

Another object of my invention is to provide an apparatus of the type described, adapted to be responsive to and record the station listened to, whether it be one broadcasting within the commercial frequency band or within one of the short-wave bands, and likewise to give a further and positive response and record that the station listened to is one broadcasting within a short-wave band.

A further object of my invention is to provide an electrically actuated means responsive to an electrical characteristic of the receiving set and including a member movable to different positions dependent upon the station to which a radio receiver is tuned.

A further object is to provide an improved apparatus for conducting surveys to obtain informational data by the sampling technique.

A further object is to provide an improved apparatus for obtaining recorded data for surveys based on the technique of sampling, in which the data is free from the possible error present when it is obtained by the usual personal interview question-and-answer method.

A further object is to provide an improved form of recording apparatus whereby a plurality of factors may be simultaneously recorded.

A further object is to provide an improved apparatus for recording the broadcasting station to which a radio receiver is tuned, by electrical connection to a radio frequency stage of the receiver, and which will record correctly irrespective of the amplitude of the radio frequency signal in said stage.

Other objects and advantages of my invention will become apparent from the ensuing description in the course of which reference is had to the accompanying drawings, in which:

Figure 1 is a diagrammatic representation of the component parts and the electrical connections therebetween of a system embodying my invention;

Figure 2 is a side elevation of the frequency responsive and recording apparatus, with one of the side panels of its enclosing cabinet removed, partly broken away better to illustrate the details thereof;

Figure 3 is a vertical transverse section taken along the line 3—3 of Figure 2 illustrating details of both the frequency responsive and recording apparatus;

Figure 4 is a view similar to Figure 3 taken along the line 4—4 of Figure 2;

Figure 5 is a horizontal transverse section taken along the line 5—5 of Figure 2;

Figure 6 is a partial vertical section taken along the line 6—6 of Figure 5, illustrating further details of the construction of the recorder;

Figure 7 is an enlarged view of a portion of the light-sensitive record tape, having recorded thereon (1) the broadcast stations to which the receiver has been tuned and the length of time the receiver has been tuned to each, and (2) the fact that the primary power supply was not interrupted during the time interval as recorded by the length of the portion;

Figure 8 is a view similar to Figure 7 showing in addition that the broadcast stations to which the receiver was tuned were stations broadcasting within a short-wave band;

Figure 9 is a view similar to Figures 7 and 8, showing that no stations were tuned in and that there were no interruptions in the power supply;

Figure 10 is a view similar to the immediately preceding figures illustrating a record of the interruption of the power supply;

Figure 11 is a diagrammatic representation of the electrical apparatus and circuits embodied in my invention;

Figure 12 is a diagrammatic representation of a modified form of frequency responsive device adapated to be utilized in place of the one illustrated in Figure 11;

Figure 13 is a view similar to Figure 12 of a further modification of the frequency responsive device; and Figure 14 is a partial diagrammatic representation of a modification of a recorder circuit whereby a record may be obtained of the reception of broadcast stations operating within a plurality of short-wave bands.

The general nature of my invention may be understood from a brief description of the system as a whole which is illustrated diagrammatically in Fig. 1. Upon reference to this figure, it may be noted that the system comprises three electrically interconnected major parts: first, a multi-band radio receiver set 10; second, a relatively small cabinet 12, housing amplifying means and a transducer; and third, a frequency responsive meter and recorder housed within a relatively small sized and substantially light-proof cabinet 14 which is preferably located remote from the receiver set and from the amplifying means.

The receiving set may be of any design or manufacture because of the universal applicability of my invention to receiving sets of practically any design or manufacture. The set has been illustrated as a table model having a tuning dial 18 on its front panel and a loudspeaker compartment 20. A station tuning knob 22, suitably secured in operative relationship to station tuning condensers in a manner well known to those skilled in the art, is mounted on the front panel as are the usual combined power and volume control switch 24 and a band selector switch 26. The latter, it is assumed for the purpose of describing the invention, is operable from a normal position conditioning the set for reception of stations broadcasting within the commercial frequency band to a displaced position, conditioning the set for reception of stations broadcasting within one of the short-wave bands.

The radio set is supplied with suitable power (ordinarily 110 volts A. C.) through the usual plug connector 28 attached to the set, a second plug connector 30 leading from the power supply to the recorder for a reason to be hereinafter amplified, and an intermediate conductor 32. The conductor 32 is preferably connectable to the recorder by a socket 34.

An electric voltage, having a characteristic indicative of the broadcast station to which the receiver is tuned, is supplied to the amplifying means through a conductor 36 and a conductor 38 common to this circuit and to the amplifier power supply circuit. The amplifier, which is preferably of the thermionic type, is preferably but not necessarily supplied with cathode heater current through the common conductor 38 and a conductor 40, which is ordinarily connected to a cathode heater transformer (not shown). Positive plate potential is supplied to the plate of the thermionic amplifier through a fourth conductor 42. While I have described a preferred arrangement in which the amplifier is supplied with energizing power from the radio receiver, it should be apparent that it is possible to energize the amplifier through a separate power pack built into the cabinet 12 similar to that found in the radio receiver.

The amplified radio frequency voltage derived from the receiver is supplied to a transducer and then transmitted to a differential meter of a type to be described more fully hereinafter through three conductors 44, 46, and 48. The novel construction of the transducer and the meter, in so far as their electrical characteristics are concerned, will be described more fully after a detailed consideration of the recorder construction.

While the amplifier and transducer have been illustrated in Fig. 1 as located at a point halfway between the receiver and the recorder, they should ordinarily be placed relatively near the former, in order to avoid the deleterious effect of local electromagnetic or electrostatic disturbances upon the conductor 36, which is connected to a radio frequency circuit of the receiver, and also to minimize inter-conductor capacities.

The above described inter-unit conductors are the only ones required unless it is desired also to record short-wave reception. One of the advantages of my invention resides in the fact that short-wave listening can be recorded both simply and economically by the addition of two conductors and a few other parts, some of which are mentioned specifically at this point and others hereinafter. The two conductors mentioned are conductors 50, leading from the recorder to a mercury switch 52 (see Fig. 11) operable simultaneously with the band selector switch 26 mounted on the receiver. As will appear more fully hereinafter, the mercury switch 52 occupies a circuit breaking position when the selector switch is in its normal position conditioning the receiver for reception of stations broadcasting within the usual commercial frequency band, and a circuit closing position when the selector switch is operated to a displaced position to condition the set for short-wave reception.

The recorder of the present invention is designed to perform its several functions with a minimum of movable parts and forms an important element of the combination of elements constituting my invention. It comprises a plurality of light sources, all electrically energized and suitably controlled, an element the position of which is varied in response to the variations in the electrical characteristic indicative of the various stations to which the receiver is tuned, and a photo-sensitive tape moved at a constant speed upon which the position of the element is continuously recorded.

The physical construction of the recorder may be noted from Figs. 2 to 6, inclusive, and in the following description thereof reference will be had primarily to these figures and also to Fig. 11 which illustrates the electrical circuit arrangement of the system as a whole. The recorder is mounted within the cabinet 14, which comprises a horizontal base 60 and a side wall and top forming structure 62 removably secured to the base by a plurality of fastening means indicated by reference numerals 64. Several of the parts of the recorder are adapted to be supported on three spaced apart vertically disposed frame plates 66, 68, and 70 of substantially rectangular shape. The frame plates are attached at their lower extremities to four relatively short supports 72 secured to the base. Plates 68 and 70 are spaced apart at their lower ends by a pair of circular spacer bars 74, intermediate their ends by a pair of spacer bars 76 and 78, and at their upper ends by a single spacer bar 80. These bars are so located as to provide a rigid structure without interfering with the operating parts of the recorder to be described hereinafter. Plates 66 and 68 are separated at their lower ends by two of the supporting flanges 72 and at their intermediate and upper portions by relatively short spacer bars 82 and 84, respectively. The plates and bars are held together by suitable fastening means, which have been illustrated but not numbered for the purpose of simplifying the description.

The light-sensitive record tape 86 upon which the various data are recorded is driven at a predetermined constant speed under normal conditions, that is, when the electric power is available, by a constant speed self-starting synchronous motor (not shown) housed within a suitable casing 88. Under abnormal conditions, that is during power interruptions, the tape is driven at the same speed by power derived from a spring (also not shown) mounted within the casing 88. The motor and spring construction may be of any well-known form, the only prerequisites being that the spring be tensioned when the motor is operating and that the spring be of a size to furnish sufficient power to drive the tape for a period exceeding all but the most exceptional cases of power failure.

The tape 86 is driven at a constant slow speed through suitable gearing, indicated as a whole by reference character 90, mounted between plates 66 and 68 and adapted to drive a feed roller 92 disengageably and rotatably mounted between plates 68 and 70. The feed roller is provided with peripheral sprockets 94 near its opposite ends adapted to engage marginal spaced apart perforations 96 provided near the edges of the tape, so that rotation of the feed roller imparts longitudinal movement to the tape.

The disengagement of the feed roller is provided by the slidable shaft 97, which is keyed to the driving shaft 98 within the hollow shaft of the feed roller. A key on shaft 97 engages a slot in the end of the hub of the roller when in its normal position. Shaft 97 is slidably and rotatably mounted in plate 70 and a substantially U-shaped bracket 100 attached to the plate. It is biased toward the roller by a compression spring 102 and may be moved in the opposite direction by a knob 104 mounted on the other end of the shaft.

The tape (which is preferably a form of positive photoprint paper and which is dry-developed, but which may be of some other suitable type, such as ordinary photographic film) is held in engagement with the feed roller by a guide roller 106 located directly thereunder and mounted for rotation between the plates 68 and 70. The guide roller is provided with a pair of annular grooves 107 (see Fig. 2) providing the necessary clearance for sprockets 94.

A tape supply spool 108 of usual construction and rotated as a result of pull on the tape by feed roller 92 is removably supported in a pair of stub shafts 109 and 110, adapted to engage opposite ends of the spool in the manner customarily followed in supporting film spools in cameras and the like. The shaft 109 is, like shaft 97, slidably and rotatably mounted in plate 70 and in a substantially U-shaped bracket 111 secured to the plate. It is biased into engagement with the spool by a compression spring 112 and may be moved out of engagement with the spool by means of a knob 113 mounted on the outer end of the shaft. The supply spool is frictionally held against undue rotation by a spring disc 114 bearing against nuts 116 adjustably mounted on the threaded outer end of the shaft 110.

From the feed roller the tape is led over a guide roller 118, rotatably mounted in the plates 68 and 70, to a take-up spool 120 similar in all respects to the supply spool 108. The take-up spool is mounted upon a pair of stub shafts 122 and 124, the former being similar in all respects and mounted, like stub shaft 109, in the plate 70 and a bracket 111. Stub shaft 124, however, is adapted to be driven at a speed sufficient to wind the tape fed by the feed roller irrespective of the varying amounts of tape on the take-up spool. To accomplish this purpose, the stub shaft 124 is driven by a spur gear 126 and a friction clutch mechanism comprising the convex spring disc 128 and a pair of nuts 130 adjustably mounted on the threaded end of the shaft 124. The spool 120 is also removably mounted on stub shafts 122 and 124 in the manner customarily followed in supporting film spools in cameras and the like.

Interposed between the feed roller and the guide roller 118 is an angularly disposed light-impervious plate 132 on the front surface of which the tape slides properly to position it for the application of the various record data. Further to insure proper positioning of the tape and to prevent the exposure of the entire tape to the various light sources of the recorder, the outer surface of the tape is covered by a substantially U-shaped metallic screen 134 provided with a narrow transverse slit or aperture 136, having a length slightly less than the distance between the sprockets on the feed roller and a pair of relatively small circular apertures 138 and 140 at the opposite sides thereof substantially in alignment with the sprockets and a substantial distance above the slit. Each of the apertures is associated with an individual light source in a manner and for a purpose to be described shortly.

The plate 132 and shield 134 are mounted upon a pair of slotted angularly disposed supports 142 attached to the frame plates 68 and 70.

The continuity of the supply of the primary power is recorded upon the tape by means of a light source 144 adapted to be energized whenever power is obtainable for operation of the radio receiver. The light source 144 is placed adjacent the aperture 138 so that the light rays are directed upon the tape to provide, when the tape is properly developed, a relatively wide light line 146 upon the otherwise dark edge 148 of the record tape, as illustrated in Figs. 7 to 10, inclusive. When the power supply fails, the light is extinguished and the entire edge of the tape is dark for a length proportional to the length of the interruption, as illustrated at 147 in Fig. 10. The record of the continuity of the power supply will not interfere with the record of the stations to which the receiver is tuned, because the light source and the aperture associated therewith are so located that the record line 146 is in line with the perforations along the edge of the tape. In order to prevent the light rays from the light source 144 affecting other parts of the tape, the light source and its associated aperture are enclosed within a small metallic casing 150 secured in suitable manner to one of the pair of angularly disposed supports 142. The light source may be suitably mounted within the casing, and in Fig. 6 it has been shown supported upon a suitable receptacle 152 mounted upon the bottom of the casing 150. A pair of conductors 154 and 156 lead to the receptacle. These conductors, as will be described more fully in connection with a consideration of the circuit arrangement of the entire system, are connected directly across the main power supply conductors 30.

A record of the time that the radio receiver is tuned to the short-wave stations is provided by a light source 158, which is adapted to be energized whenever the band selector switch 26 is operated to its displaced position to condition the set for short-wave reception. When this light source is energized, a light line 160 remains on the otherwise dark right edge 162 of the record tape when the tape is developed, as indicated in Fig. 8. The light source 158 and aperture are enclosed by a casing 164 similar to the casing 150 previously described and is similarly mounted upon the other of the angularly disposed guides 142. The light source 158 is removably mounted in a receptacle 166 mounted on the bottom of the casing 164, and power is selectively supplied to the light source through a pair of conductors 168 and 170 under the control of the band selector switch in a manner to be described more fully hereinafter.

The broadcast stations to which the receiver is tuned are recorded upon the central portion of the tape by means of a light source 172 adapted to be energized a predetermined length of time after the radio power control switch 24 has been turned to its "on" position through a circuit including a thermal relay 174 mounted on the outer side of frame plate 70. The light source is supported substantially centrally and in front of the tape by a bracket 176 removably supporting a receptacle 177. The light rays emanating from the source are focused toward the transverse slit 136 by a lens 178. Interposed between the lens and the slit is a generally vertically disposed needle 180, the position of which is varied in response to the frequency of the local oscillator of the radio receiver and, therefore, in response to the frequency of the broadcast station to which the receiver is tuned. In other words, the needle occupies a position indicative of the station to which the receiver is tuned. The needle is made narrow so as to cast substantially a point shadow upon a predetermined portion of the record tape. When the photo-sensitive tape is developed, the result is a line or a plurality of lines of dark color, as indicated in Figs. 7, 8 and 10 by reference numerals 182. The stations broadcasting at the ordinary commercial frequency are recorded upon the major portion of the tape, as illustrated in Fig. 7, and the short-wave stations are recorded along one edge, preferably the right edge, as indicated by the dark lines 184 of Fig. 8. It should be noted that the aggregate length of these lines equals the length of the line 160 showing that the receiver has been tuned to short-wave broadcasting stations. Broad line 160 indicates duration of listening to the short wave bands, but, in addition, lines 184 also indicate the specific short wave stations.

The meter of which the needle 180 forms a part has a pair of moving coils energized differentially by variable uni-directional currents derived from the transducer housed within the cabinet 12. Before describing the electrical circuits in detail, it is deemed best to state that the meter comprises a pair of horseshoe magnets 186 secured in parallel relationship to the opposite sides of an insulating block 188 fastened to a support 190 in turn secured to the base 60. Within the fields of the permanent magnets are the previously mentioned moving coils 192 and 194 (see Fig. 11) so arranged with respect to the needle 180 that they tend to effect movement of the needle in opposite directions in response to the currents flowing therethrough. The shape of the pole faces and the positioning of the coils for the particular apparatus shown is such that the deflection of the needle is determined by the ratio of the currents in the two coils, rather than their numerical difference the construction of the meter, therefore, being of the same general type as utilized in cross coil ohmmeters. Coils 192 and 194 are provided with suitable conductors leading directly to terminals mounted upon a terminal strip 196 attached by fastening means 198 to the insulating support 188. The terminals are connected to conductors 44, 46 and 48, as illustrated in Figs. 2 and 11. While a particular type of ratio or differential instrument has been illustrated and described, it is contemplated that other types well known to those skilled in the art may be utilized differentially to govern the position of the needle 180.

The differential instrument is supplied with variable direct currents through the combined amplifier and transducer 12 that forms one of the vital elements of my invention. In the further description of my invention, and particularly of the amplifier and transducer and the manner of their connection to the receiver, I will refer now, more particularly to Fig. 11.

The amplifying means, as has been stated briefly heretofore, is connected to the radio receiver through conductors 36, 38, 40, and 42. The high frequency signal voltage utilized to actuate the needle 180 is derived from the radio set through conductor 36, which may be connected at the point A to the grid 200 of a multi-element thermionic tube 202 forming part of the local oscillator, may be connected at point B of the resonant tuning circuit, or may be connected at point C to the plate 202, whichever may be most convenient. The fact that the point of connection, whether to point A, B or C, is optional, is diagrammatically indicated in Fig. 11 by the three-position switch 203. The grid 200 is also connected, in accordance with usual custom, to a grounded grid leak resistor 204. The value of the high frequency voltage derived from the oscillator circuit is adjusted by a variable condenser 206, which is in series with conductor 36. One of the advantages of the use of an amplifier is that condenser 206 may be made small enough to cause very little or no detuning of the receiver circuit, because very little power is required to operate the amplifier.

The amplifier means comprises a three-element thermionic tube 208, the cathode of which is heated by current supplied to an associated heater element through conductors 38 and 40, and provided with a grid resistor 205. The plate of the tube is supplied with suitable voltage through a conductor 42 and a plate resistor 210 providing also, with a variable connection 212, a potentiometer whereby the potential supplied to the transducer may be further adjusted. A by-pass condenser 213 is connected from the cathode to the plate voltage supply.

The transducer forming a primary feature of my invention includes a tuned circuit 214 and a resistance 216 having associated therewith rectifiers 218 and 220, respectively, for converting the high frequency alternating voltages developed across the tuned circuit and the resistance into uni-directional currents which are supplied to the differential windings 192 and 194. Accordingly, since the flow of current through the resistance is independent of the frequency and the flow of current through the tuned circuit 214 is dependent upon the frequency variations in the frequency of the voltage derived from the radio receiver, a change in frequency results in variations of the current flowing through the windings. Since the position of the needle 180 is determined by the ratio of the values of current flowing through the two windings, the needle indicates directly the frequency of the oscillator and likewise the frequency, and hence the broadcast station, to which the radio receiver is tuned. The range of frequencies over which the device is used is at one side of the resonance frequency of the tuned circuit and thus does not extend beyond the resonance peak. In fact, the resonance frequency may be a couple of hundred kilocycles from the adjacent end of the range of operation.

The tuned circuit 214 and resistance 216, which are connected in series by a conductor 222 are isolated from the D. C. plate voltage by a pair of blocking condensers 224 and 226. The series connection 222 is connected directly to conductor 46 forming a common return for both coils of the meter. Rectifier 218, which is a half-wave rectifier, of the carborundum dry type, for example, is connected between the tuned circuit and coil 192 associated therewith through conductor 44. Rectifier 220, similar in all respects to rectifier 218, is connected between the resistance 216 and the other coil 194 through conductor 48. Filter capacitances 228 are connected in parallel with the two windings.

The transducer described above may take forms other than that specifically shown in Fig. 11. For instance two tuned circuits inductively coupled to the output of the amplifier may be utilized in place of the single tuned circuit and resistance of the circuit already described. This alternative arrangement is illustrated in Fig. 12, from an inspection of which it may be seen that a pair of primary coils 230 and 232 are connected in series across a portion of the resistor 210 in the plate circuit of the amplifier tube 208. The coil 230 has associated therewith a tuned circuit comprising a secondary coil 234 and condenser 236 connected in parallel. The coil 232 has associated therewith a tuned circuit comprising a secondary coil 238 and condenser 240 connected in parallel. The remainder of the circuit is the same as that previously described. By tuning the two tuned circuits to resonate at different frequencies the direct currents supplied to the opposed coils of the meter vary with the frequency of the alternating voltage induced in the coils of the tuned circuits, thereby to effect movement of the needle to a position indicative of the station to which the receiver is tuned.

A further modification of the transducer is illustrated in Fig. 13. According to this modification one of the windings of the meter is supplied with uni-directional current through rectifier 218 connected in series with a secondary coil 242 in which a high frequency alternating voltage is induced by a primary coil 244 connected in series with a condenser 246 across a portion of the plate resistor 210. The other winding of the meter is similarly supplied with uni-directional current through the other rectifier 220 which is connected in series with a secondary coil 248 in which a high frequency alternating voltage is induced by a primary coil 250 connected in series with a resistance 252 across a portion of the plate resistor 210. It may be seen, therefore, that the primary circuits are in parallel and not in series as in the modification of Fig. 12. Other modifications will readily occur to those skilled in the art.

The correlation of the various parts of the system may be better understood from a description of the operation of the system as a whole, in the course of which reference is made primarily to Fig. 11. From this figure it may be seen that the self-starting synchronous motor housed within casing 88 is energized whenever the power leads 30 are plugged into a suitable power socket. In order to test the operation of the clock without the necessity of pulling the power leads, the clock has in series with it a push button switch 254 biased to its closed position. From Fig. 4 it may be seen that the switch is mounted on the outer side of the frame plate 70 where it is readily accessible whenever the upper portion of the recorder cabinet is removed. Momentary opening of the switch and subsequent closure thereof will readily give an indication as to whether or not the standby movement of the clock drive is in operative condition.

Since the light source 144 is connected directly across the power leads, it is energized as long as power is available. Since the synchronous motor is energized under similar conditions, a continuous record, indicated by reference numeral 146, is apparent on the left edge of the record tape after the tape has been developed. In case of a power interruption for any reason whatever, the light source and motor are both de-energized. Upon such occurrence the tape is driven by the standby movement and since the light is extinguished, the entire left edge of the tape is dark after development, as indicated in Fig. 10.

When the radio is turned on by closure of the combined power and volume control switch 24, power is supplied thereto through the pairs of conductors 30, 32, and 28. One of the conductors 30 has interposed in series therewith the low resistance thermal relay 174. The relay comprises a low resistance adjustable heater 256, so arranged that the circuit therethrough cannot be interrupted, and a movable bi-metallic switch blade 258 adapted to close an energizing circuit to the light source 172 a predetermined short interval after the radio has been turned on. The light-energizing circuit extends across the power leads 30 through the switch blade 258 and conductors 260, 262 and 264.

In the further description of the operation it is assumed that the band selector switch 26 is in position conditioning the radio receiver for reception of stations broadcasting within the usual commercial frequency band. At this time the mercury switch 52 is in circuit opening position so that the circuit to the short-wave indicating light source 158 is opened at the switch. As soon as the light source 172 is energized in the manner just described, light rays are directed to the central portion of the record tape through the narrow elongated slit 136, and a shadow cast upon the tape at a point determined by the position of the indicating needle 188 of the meter. The position of this needle varies, as has been fully described above, to indicate the station to which the radio receiver is tuned. In view of the foregoing description of the operation of the amplifier and the transducer, it is believed unnecessary to repeat it here. Suffice it to say that the high frequency voltage derived from the oscillator circuit of the radio receiver is first amplified by the amplifier 208 and then converted into uni-directional currents by the rectifier 218 and 220. The currents flow through the two oppositely acting moving coils 192 and 194 of the indicator. As the tuning is changed from time to time, the variations in the local oscillator frequency effect variations in current flow through the opposed coils of the meter, thereby continuously to actuate the needle in response to the change in the tuning of the radio receiver. During all this time the light-sensitive tape is moved at a constant rate through the intermediary of the gears and the feed roller and take-up spool described in detail above. Consequently, it is a relatively simple matter to determine the length of time that any particular one or all of the stations are listened to, as well as the time each station is turned on and also off.

The value of the high frequency voltage derived from the radio set may be controlled by adjustment of the condenser 206 connected in series with conductor 36. The adjustment of this condenser, as well as fluctuation of the radio frequency voltage for any other reason, does not affect the reading of the meter because the ratio of the currents in the two opposed coils is dependent only on frequency. Consequently, the needle position varies only in response to the tuning of the radio set.

When it is desired to listen to a short-wave broadcasting station, the band selector switch 26 is operated to its displaced position, thereby to operate the mercury switch 52 to circuit closing position. This effects energization of the light source 158 through a circuit including conductor 260, the movable bi-metallic switch blade 258, one of conductors 30, switch 52, the other of conductors 30, conductors 170 and 168. The energization of light source 158 results in the marking of the tape at its right edge, as previously described and as illustrated in Fig. 8. It is apparent, therefore, that a continuous record of the listening preferences or habits of the listener are recorded and are obtainable in a manner that causes the listener practically no inconvenience and with apparatus that does not materially affect his selection of programs.

Many of the modern radio sets are so constructed that they are capable of receiving signals from stations broadcasting within more than one short-wave band. If it is desired to indicate to which one of several short wave bands a broadcast receiver was tuned, it is necessary only to place another mercury switch and light source in parallel with the mercury switch 52 and light source 158 of the above described modification. Such a modification has been illustrated in Fig. 14 where the mercury switch 266 is shown connected in series with a light source 268 and these two elements are connected in parallel with the switch 52 and light source 158. The mercury switch 266 is so arranged with respect to mercury switch 52 that the two are operated simultaneously, but are operable into circuit closing position sequentially. In case it is desired to utilize this modification, it is apparent that the recorder would have to be modified slightly in order to provide means similar to that already described for directing the light rays from lamp 268 to a separate portion of the record tape.

It may be seen that my invention has the many advantages that were considered in the introductory part of the specification and that primary among these are the simplicity of arrangement, the fact that it can be built and installed very economically with a minimum of inconvenience to the radio listener both at the time of installation and subsequently when the record data are collected, and that the recorder may be placed remote from the radio set where it will not materially affect the selection of programs by the listener. Furthermore, in addition to all these advantages, it may be seen that the apparatus may be installed in new radio receiving sets as well as in those already in existence and in use, irrespective of the type of receiver circuit or the method of tuning utilized.

As previously intimated, the apparatus of the present invention is utilized in making surveys which will be useful to radio advertisers in determining the approximate number of people who habitually listen to the advertisers' programs. In conducting a survey of this character, the apparatus of the present invention will be employed only in a relatively small percentage of the homes within the listening area being surveyed, but in order to obtain a representative sampling of radio listeners, it is essential that the apparatus be placed in homes of different income, occupational and social classes. For this reason it is especially essential that the apparatus be readily applicable to radio receivers of all different types and makes, and that its installation be accompanied with as little inconvenience to the radio owner as possible and that it be inconspicuous and unnoticeable so that the user of the radio will not in any way be influenced in his selection of programs by the fact that the apparatus is making a record of his program selections.

After the apparatus has been installed, the service man making the installation will calibrate the markings on the tape with respect to the stations within the listening area of the particular radio receiver, calibrating a section of the tape separately for the short wave bands, as well as for the regular broadcast band, and will note upon the record the time at which the operation of the apparatus was started. Then, after a month or similar period, the service man will remove the exposed record tape and replace it with an unexposed tape. The record tape will be duly marked with the serial number of the apparatus from which it is removed, the time of removal, and with other identifying data. The various record tapes from a plurality of installations will then be collected and decoded so that the records upon the tapes may be broken down into compilations of data which will be of necessary in-

What I claim as new and desire to secure by United States Letters Patent is:

1. Apparatus for denoting the radio broadcast stations to which a radio receiving set is selectively tuned, including in combination, means for deriving from the receiving set a signal voltage having a variable characteristic indicative of the station to which the set is tuned, and means responsive to said characteristic for denoting the variations in said characteristic and thus the stations to which the receiving set is tuned.

2. Apparatus for denoting the radio broadcast stations to which a radio receiver is selectively tuned, including in combination, means for deriving a radio frequency signal from the receiver having a frequency indicative of the station to which the receiver is tuned, means for amplifying the derived signal, and means for supplying the amplified signal to a radio frequency meter thereby to provide an indication of the stations to which the receiver is selectively tuned.

3. Apparatus for denoting the radio broadcast stations to which a radio receiver is selectively tuned, including in combination, means for deriving from the receiver a radio frequency voltage indicative of the station to which the receiver is tuned, means for impressing said radio frequency voltage across a circuit including two portions having different impedance-frequency relationships, means for rectifying the voltages derived from each of said portions, and a meter including a pair of coils each receiving unidirectional voltage from one of said rectifying means and a movable member actuated thereby, said circuit, rectifying means and meter being so constructed and arranged that the movable member of the meter is moved to different positions for different stations in the broadcast band and to which the receiver is selectively tuned.

4. Apparatus for recording the radio broadcast stations to which a radio receiver is selectively tuned upon a recorder of the type comprising a light-sensitive tape moved at a predetermined speed, a light source and a movable element interposed between the light source and tape, including in combination, power supply leads for said receiver, means for deriving a radio frequency voltage from the receiver indicative of the station to which the receiver is tuned, means responsive to said frequency adapted to control the position of said movable element thereby to provide an indication of the station to which the receiver is tuned, and means for connecting the light source to said power supply leads whenever the radio receiver is energized.

5. Apparatus for recording the radio broadcast stations to which a radio receiver is selectively tuned upon a recorder of the type comprising a light-sensitive tape moved at a predetermined speed, a light source and a movable element interposed between the light source and tape, including in combination, power supply leads for said receiver, means for deriving a radio frequency voltage from the receiver indicative of the station to which the receiver is tuned, means responsive to said frequency adapted to control the position of said movable element thereby to provide an indication of the station to which the receiver is tuned, and means including a thermal relay in series with said receiver and energizable simultaneously with said receiver for connecting the light source to said power supply leads whenever the receiver is energized.

6. Apparatus for recording the radio broadcast stations to which a radio receiver of the multi-band type provided with a band selector switch is selectively tuned upon a recorder of the type comprising a light-sensitive tape moved at a predetermined speed, a first light source, a movable element interposed between said light source and the tape, and a second light source adapted to affect a portion of the tape unaffected by the first light source, including in combination, power supply leads for said receiver, means for deriving a radio frequency voltage from the receiver indicative of the station to which the receiver is tuned, means responsive to said frequency adapted to control the position of said movable element, means for connecting the first light source to said power supply leads whenever the radio receiver is energized, and means controlled in response to operation of said band selector switch for changing the connections of said second light source to said power supply leads thereby to change the energization of said second light source when said switch is moved to condition the receiver for short-wave reception.

7. Apparatus for recording the radio broadcast stations to which a radio receiver of the multi-band type provided with a band selector switch is selectively tuned upon a recorder of the type comprising a light-sensitive tape moved at a predetermined speed, a first light source, a movable element interposed therebetween and the tape, and a second light source adapted to affect a portion of the tape unaffected by the first light source, and a third light source adapted to affect a portion of the tape unaffected by the two first-mentioned light sources, including in combination, power supply leads for said receiver, means for deriving a radio frequency voltage from the receiver indicative of the station to which the receiver is tuned, means responsive to said frequency adapted to control the position of said movable element, means for connecting the first light source to said power supply leads whenever the radio receiver is energized, and means controlled in response to operation of said band selector switch into different positions to condition the receiver for reception in different broadcast bands for selectively controlling connections of said second and third light sources to said power supply leads thereby to change the energization of said second and third light sources.

8. Apparatus for recording the radio broadcast stations to which a receiving set is selectively tuned, including, in combination, an amplifier of the thermionic type located close to the receiver, electrical connections for supplying said amplifier with a high frequency signal voltage indicative of the station to which the receiver is tuned, means located close to the receiver for transforming the amplified voltage into two unidirectional voltages, a combined meter and electrical recorder located remote from the amplifier and radio, electrical connections for transmitting said unidirectional currents to said meter, and means for rendering said recorder operative to record the response of the meter whenever said radio receiver is energized.

9. Apparatus for recording the radio broadcast stations to which a receiving set is tuned, including in combination, an amplifier, electrical connections for supplying said amplifier with a high frequency signal voltage indicative of the station to which the receiver is tuned, means connected to the amplifier for transforming the amplified voltage into two uni-directional voltages, said amplifier and transforming means being located close to the receiver, a combined meter and electrical recorder located remote from the amplifier and radio, and electrical connections for transmitting said uni-directional currents to said meter.

10. Apparatus for recording the radio broadcast station to which a receiving set is tuned, including in combination, means located close to the radio receiver for deriving from the receiver a high frequency electrical signal indicative of the station to which the receiver is tuned, means also located close to the receiver for transforming the high frequency electrical signal into a uni-directional electrical control variable with the frequency, and an electrical recorder located remote from the radio receiver supplied with said uni-directional control and including a member movable into different positions in response to variations in said uni-directional control.

HUGO L. RUSCH.